US010844874B2

(12) United States Patent
Rodrigues (10) Patent No.: US 10,844,874 B2
(45) Date of Patent: Nov. 24, 2020

(54) INLET DEVICE FOR A VERTICAL PUMP AND AN ARRANGEMENT COMPRISING SUCH AN INLET DEVICE

(71) Applicant: Sulzer Management AG, Winterthur (CH)

(72) Inventor: Arnaldo Rodrigues, Winterthur (CH)

(73) Assignee: SULZER MANAGEMENT AG, Winterthur (CH)

( * ) Notice: Subject to any disclaimer, the term of this patent is extended or adjusted under 35 U.S.C. 154(b) by 104 days.

(21) Appl. No.: 15/653,798

(22) Filed: Jul. 19, 2017

(65) Prior Publication Data

US 2018/0045222 A1 Feb. 15, 2018

(30) Foreign Application Priority Data

Aug. 15, 2016 (EP) .................................. 16184145

(51) Int. Cl.
*F04D 29/54* (2006.01)
*F04D 29/70* (2006.01)
(Continued)

(52) U.S. Cl.
CPC ....... *F04D 29/548* (2013.01); *F04D 29/4273* (2013.01); *F04D 29/4293* (2013.01);
(Continued)

(58) Field of Classification Search
CPC .. F04D 29/548; F04D 29/708; F04D 29/4273; F04D 29/4293; F04D 29/605;
(Continued)

(56) References Cited

U.S. PATENT DOCUMENTS 2,358,841 A * 9/1944 Walker .................. B01D 29/11
210/108
3,476,038 A * 11/1969 Dicmas .................. F04D 9/008
210/242.1
(Continued)

FOREIGN PATENT DOCUMENTS

JP S57198379 A 12/1982
JP S5830784 U * 2/1983 ............. Y02E 10/22
(Continued)

OTHER PUBLICATIONS

Extended European Search Report dated Feb. 23, 2017 in corresponding European Patent Application No. 16184145.7.

*Primary Examiner* — Kevin R Steckbauer
(74) *Attorney, Agent, or Firm* — Global IP Counselors, LLP (57) ABSTRACT

An intake device for a pump includes an inlet section extending in a first direction for guiding a fluid, an outlet section for delivering the fluid to an inlet of the pump, the outlet section extending in a second direction perpendicular to the first direction, and a diverting section for diverting the fluid from the first to the second direction, the diverting section connecting the inlet and outlet sections, and having a bottom wall opposing the an outlet opening and a back wall opposing an inlet opening, the inlet section tapering towards the diverting section to decrease a cross sectional area of the inlet section, the diverting section includes a splitter member arranged on the bottom wall that tapers in the second direction towards the outlet opening, and the outlet section includes an essentially bell shaped reducing part for decreasing a cross sectional area of the outlet section.

18 Claims, 7 Drawing Sheets

(51) Int. Cl.
*F04D 29/42* (2006.01)
*F04D 29/44* (2006.01)
*F04D 29/60* (2006.01)
*F04D 29/66* (2006.01)
*F16L 43/00* (2006.01)
*B23K 31/02* (2006.01)

(52) U.S. Cl.
CPC ......... *F04D 29/445* (2013.01); *F04D 29/605* (2013.01); *F04D 29/669* (2013.01); *F04D 29/708* (2013.01); *F16L 43/002* (2013.01); *B23K 31/022* (2013.01); *F05D 2250/511* (2013.01)

(58) Field of Classification Search
CPC .... F04D 29/669; F04D 29/445; F16L 43/002; F05D 2250/511; F05D 2250/51; B23K 31/022
See application file for complete search history.

(56) References Cited

U.S. PATENT DOCUMENTS

| | | | | |
|---|---|---|---|---|
| 4,076,448 | A * | 2/1978 | Sanders, Jr. | F03B 3/00 415/184 |
| 4,576,197 | A * | 3/1986 | Kempers | B67D 7/68 137/1 |
| 6,533,543 | B2 * | 3/2003 | Tagomori | F04D 29/4273 415/159 |
| 6,561,754 | B1 * | 5/2003 | Schwarz | F04D 29/528 415/213.1 |
| 6,805,539 | B2 * | 10/2004 | Schubert | F04D 29/708 137/565.01 |
| 7,513,741 | B2 * | 4/2009 | Smiley, III | F04D 29/4213 415/205 |
| 8,424,566 | B2 * | 4/2013 | Merchant | F01K 9/003 137/565.17 |
| 9,163,643 | B2 * | 10/2015 | Masutani | F04D 29/441 |
| 9,217,369 | B2 * | 12/2015 | Rodriguez | F02C 7/04 |
| 2001/0018023 | A1 * | 8/2001 | Tagomori | F04D 29/669 415/220 |
| 2005/0254941 | A1 * | 11/2005 | Inoue | F04D 29/4213 415/182.1 |
| 2007/0217906 | A1 * | 9/2007 | Smiley, III | F04D 29/441 415/200 |
| 2008/0187448 | A1 * | 8/2008 | Jones | F04D 29/708 417/342 |
| 2008/0260515 | A1 * | 10/2008 | Anami | F04D 29/0413 415/55.2 |
| 2010/0086400 | A1 * | 4/2010 | Bredwad | F04D 29/708 415/208.1 |
| 2011/0142599 | A1 * | 6/2011 | Burgess | F04D 29/4286 415/127 |
| 2011/0255953 | A1 * | 10/2011 | Smeulers | F04D 29/422 415/1 |
| 2012/0134796 | A1 * | 5/2012 | Zhao | F04D 29/426 415/208.1 |
| 2012/0253103 | A1 * | 10/2012 | Robert | F04D 29/445 600/16 |
| 2015/0308433 | A1 * | 10/2015 | Zaremba | B01D 33/06 417/61 |

FOREIGN PATENT DOCUMENTS

| | | |
|---|---|---|
| JP | S5830784 U | 2/1983 |
| JP | 2807850 B2 * | 10/1998 |
| JP | H11148498 A | 6/1999 |
| JP | 2003206885 A | 7/2003 |

* cited by examiner

Fig. 4

INLET DEVICE FOR A VERTICAL PUMP AND AN ARRANGEMENT COMPRISING SUCH AN INLET DEVICE

CROSS-REFERENCE TO RELATED APPLICATION

This application claims priority to European Application No. 16184145.7, filed Aug. 15, 2016, the contents of which are hereby incorporated herein by reference.

BACKGROUND

Field of the Invention

The invention relates to an inlet device for a vertical pump and an arrangement comprising a vertical pump and an intake device.

Background of the Invention

Vertical pumps are used for many different applications, for example, in the water industry for elevating water from a lower level to a higher level. Some specific applications are, e.g. the pumping of waste water, river, lake or sea water, irrigation water, cooling water in power generation plants or their use in firefighting systems, especially in offshore applications. A vertical pump comprises a casing with an inlet for the fluid to be pumped, an outlet for discharging the fluid, at least one impeller, but often a plurality of impellers arranged in series on a common shaft, for conveying the fluid from the inlet to the outlet, as well as a drive unit for rotating the shaft with the impeller(s). The impeller(s) may be designed in different types, for example as axial type, semi-axial type or radial type impeller(s). The designation 'vertical pump' indicates that in the normal orientation of use the shaft extends in the vertical direction. Usually the inlet is arranged at the lower end of the vertical pump and the outlet at its upper end.

In a typical application the lower end of the vertical pump comprising the inlet of the pump is suspended into the fluid to be pumped such that the inlet of the pump is completely submersed. The fluid to be pumped may be a clean or contaminated liquid, for example sewage, a fibrous slurry, or a liquid containing solids. The fluid to be pumped is contained in a sump into which the lower end of the vertical pump is submerged. Upon entering the vertical pump, the flow of the fluid should be as homogeneous and uniform as possible across the entire inlet of the pump. However, in practice there are usually adverse flow conditions at the inlet of the vertical pump in the sump, including swirls, vortices or turbulences causing rotation of the fluid adjacent to the inlet. These adverse flow conditions may considerably reduce the efficiency of the pump and may cause enormous mechanical stress acting upon the impeller(s). This results inter alia in high maintenance costs.

In order to improve the flow conditions at the inlet of the vertical pump it is known to modify the sump design by civil works, for example by dividing walls or guiding structures arranged in the sump. However, this results in a quite complex design of the sump requiring a considerable amount of civil work and thus causes additional costs.

It is also known to provide the vertical pump with an intake device attached to the inlet of the pump to improve the flow conditions at the inlet of the pump. U.S. Pat. No. 8,177,500 discloses, for example, an intake device that shall create a uniform flow of liquid entering a vertical pump. The intake device comprises an inlet section having an orifice and a decreasing cross section area seen in the direction from said orifice for gradually accelerating the flow of the fluid, a redirection section for redirecting the flow from a horizontal to a vertical direction, and an outlet section arranged to be connected to the inlet of a vertical pump. The intake device is characterized in that at least a part of a circumferential wall edge of the inlet section extending around the orifice comprises a bevel.

SUMMARY

Starting from this state of the art it is an object of the invention to propose an improved and different intake device for a vertical pump, that may be connected to the inlet of the pump and which generates favorable flow conditions at the inlet of the pump by at least reducing turbulences and vortices. The device shall be simple in construction and cost efficient. In addition, it is an object of the invention to propose an arrangement comprising a vertical pump and such an intake device connectable to the inlet of the pump.

The subject matter of the invention satisfying these objects is characterized by the features disclosed herein.

Thus, according to an embodiment of the invention an intake device for a vertical pump is proposed, comprising an inlet section with an inlet opening for a fluid to be pumped by the vertical pump, the inlet section extending in a first direction for horizontally guiding a flow of the fluid, an outlet section with an outlet opening for delivering the fluid to an inlet of the pump, the outlet section extending in a second direction being perpendicular to the first direction, and a diverting section for diverting the flow of fluid from the first direction to the second direction, the diverting section connecting the inlet section with the outlet section, and having a bottom wall opposing the outlet opening as well as a back wall opposing the inlet opening, wherein the inlet section tapers towards the diverting section to decrease a cross sectional area of the inlet section, wherein the diverting section comprises a splitter member arranged on the bottom wall and designed to taper in the second direction towards the outlet opening, and wherein the outlet section comprises a reducing part for decreasing a cross sectional area of the outlet section, the reducing part designed in an essentially bell shaped manner.

Especially the combination of the tapering splitter member with the essentially bell shaped reducing part in the outlet section generates favorable flow conditions of the fluid at the outlet opening of the intake device and therewith at the inlet of the vertical pump. The generation of adverse vortices or turbulences is at least considerably reduced, so that the flow of the fluid is homogeneous and uniform. The tapering splitter member diverts the flow of fluid concurrently in two dimensions, namely in both directions that are perpendicular to the first direction. With regard to the normal arrangement during operation, the first direction is a horizontal direction. Thus, the splitter member diverts the flow of fluid moving from the inlet opening mainly in the first—horizontal—direction towards the splitter member both laterally, i.e. to the left and to the right, and into the vertical direction. Downstream of the splitter member, the essentially bell shaped reducing part of the outlet section smoothly guides the flow of fluid to the outlet opening avoiding or reducing vortices or swirls at the outlet opening through which the fluid reaches the inlet of the vertical pump.

The designation 'essentially bell shaped' shall indicate that the overall shape of the reducing part is at least pretty close to a bell shape. As will be explained later on in more detail, according to a preferred embodiment the intake device is fabricated from a plurality of metallic parts, e.g. metal sheets or plates and/or metallic bands which are joined preferably by welding. The bell shape may be realized by several adjacent metallic bands. By this fabrication, edges or corners may occur at the boundary of two adjacent metallic bands. Thus, the resulting surface is rather like a polygon face than like an ideal, constantly curved bell surface with no edges. 'Essentially bell shaped' shall be understood to comprise such embodiments, i.e. where the bell shape is approximated by a polygon face.

According to a preferred embodiment the inlet section comprises a bottom, a cover and two side walls each connecting the bottom with the cover, as well as a partition wall extending in the first direction from the inlet opening towards the diverting section, and extending in the second direction from the bottom to the cover. By providing the partition wall in the inlet section, the flow of fluid entering the intake device is divided into two partial flows which are guided parallel to each other in the inlet section and which are separated from each other by the partition wall. By this measure the probability of vortex or swirl generation is reduced even more. In addition, it is possible to break existing vortex structures or swirls before they reach the inlet of the vertical pump.

It is an advantageous measure when the partition wall is extending at the bottom wall of the diverting section and ending at or closely to the splitter member, because the two partial flows are then kept separated from each other at least until they reach the splitter member. This supports a uniform flow of the fluid.

Preferably, the partition wall divides the inlet opening into two orifices having the same cross sectional area perpendicular to the first direction. Thereby the two partial flows are essentially equal, i.e. the have essentially the same flow rate. This is a very symmetric arrangement which can contribute to a uniform flow at the outlet opening.

In order to keep the two partial flows separated at least until they reach the region of the splitter member and concurrently ensure a smooth diversion of the partial flows by the splitter member, it is preferred, when the partition wall has an ending edge adjacent to the splitter member, the ending edge starting at the bottom wall and being inclined both with respect to the first and the second direction. The chamfered design of the ending edge may help to reduce or to avoid turbulences when the flow of fluid is diverted by the splitter member A further preferred option for the design is that the bottom wall of the diverting section extends with respect to the first direction beyond the outlet opening such that there is a displacement in the first direction between the back wall of the diverting section and the wall delimiting the outlet opening.

According to a preferred embodiment, the intake device has a stopper wall arranged between the back wall of the diverting section and the splitter member. By the stopper wall, the space of the diverting section located behind the splitter member—as seen in the direction of the flow of fluid coming from the inlet opening—is divided in a similar manner as the inlet section is divided by the partition wall. Thereby the two partial flows remain essentially separated also in that space behind the splitter member. Thus, each partial flow of fluid is guided separately from the first (horizontal) to the second (vertical) direction. To maintain the separation of the two partial flows of fluid even in the space behind the splitter member may further improve the flow conditions of the fluid at the outlet opening.

Regarding the stopper wall it is preferred that the stopper wall extend in the first direction and is in alignment with the partition wall. Thus, the partition wall and the stopper wall form a common straight wall extending in the first direction and being interrupted by the splitter member. In other words, in this embodiment the stopper wall constitutes an extension of the partition wall in the space behind the splitter member.

For the same reasons as already explained with respect to the partition wall it is advantageous when the edge of the stopper wall facing the splitter member is chamfered, i.e. the stopper wall has a beginning edge adjacent to the splitter member, the beginning edge starting at the bottom wall and being inclined both with respect to the first and the second direction.

In order to realize a symmetrical design, that is advantageous for favorable flow conditions at the outlet opening, it is a preferred measure, that the splitter member is arranged to be centered with respect to the outlet opening.

Regarding the design of the tapering splitter member it is a preferred embodiment, when the splitter member is rotationally symmetrical with respect to a longitudinal axis extending in the second direction.

According to a preferred design, the splitter member is designed in an essentially cone-shaped or frustoconical manner.

The intake device may be manufactured by any method known in the art, for example by casting or by subtractive manufacturing processes like machining, metal cutting or milling or combinations thereof. In order to make the intake device particularly cost efficient and especially in view of low manufacturing costs, it is a preferred embodiment, that the intake device is fabricated from a plurality of metallic parts which are joined, preferably by welding. In this embodiment the intake device is assembled from a plurality of metallic parts that are prepared by cutting or machining to have an appropriate shape. The individual metallic pieces are then joined by welding to form the intake device.

Preferably the plurality of metallic parts comprises metallic sheets or metallic plates or metallic bands.

In addition, according to the invention an arrangement is proposed comprising a vertical pump and an intake device for the vertical pump, wherein the intake device is designed according to the invention, and wherein the outlet section of the inlet device is connected to an inlet of the vertical pump. Thus, the outlet opening of the intake device faces the inlet of the vertical pump. Preferably, the outlet opening of the intake device has the same diameter as the inlet of the vertical pump. The cross sectional area of the outlet opening is congruent with the cross sectional area of the inlet of the vertical pump and both areas are immediately neighboring.

The intake device according to the invention is also particularly suited for retrofitting existing installations of vertical pumps. By providing the vertical pump with an intake device according to the invention which is attached to the inlet of the pump the flow conditions at the inlet of the pump may be considerably improved. The flow of the fluid becomes more uniform, the occurrence of vortices or swirls at the inlet of the pump is remarkably reduced. This increases the efficiency of the pump and reduces the maintenance cost.

In particular, in such applications where it is not possible or too laborious or too expensive to modify the design of the sump by civil work, the intake device according to the invention is a cost efficient and effective solution to address adverse flow conditions at the inlet of the pump.

Further advantageous measures and embodiments of the invention will become apparent from description herein.

BRIEF DESCRIPTION OF THE DRAWINGS

The invention will be explained in more detail hereinafter with reference to the drawings.

DETAILED DESCRIPTION OF THE EMBODIMENTS

Figure 1:
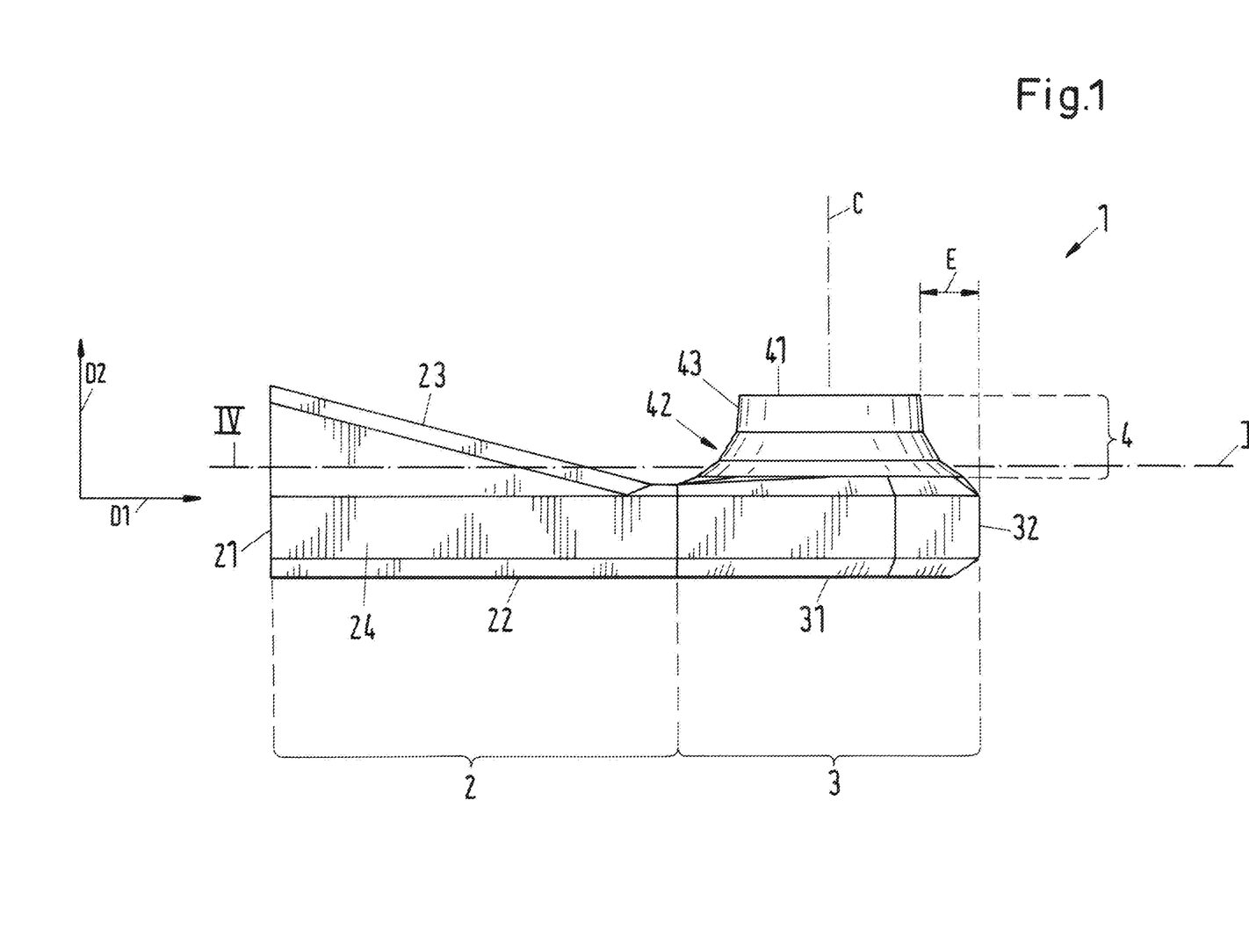
FIG. 1 is a side view of an embodiment of an intake device according to the invention.

FIG. 1 shows a side view of an embodiment of an intake device according to the invention which is designated in its entirety with reference numeral 1. The intake device 1 comprises an inlet section 2 for a fluid to be pumped. The inlet section 2 extends in a first direction D1. The intake device 1 further comprises an outlet section 4 with an outlet opening 41 for discharging the fluid. The outlet section 4 extends in a second direction D2 being perpendicular to the first direction D1. The inlet section 2 and the outlet section 4 are connected by a diverting section 3 arranged between the inlet section 2 and the outlet section 4. The diverting section 4 diverts the flow of fluid from the first direction D1 to the second direction D2.

Relative terms like 'top', 'bottom', 'side', 'below', 'above' and so on are always referring to the normal arrangement of the intake device during operation, i.e. in the operational state. In this normal arrangement of the intake device 1 the second direction D2 is usually the vertical direction, i.e. the direction defined by the gravity and the first direction D1 is usually a horizontal direction, i.e. a direction perpendicular to the vertical direction.

Figure 7:
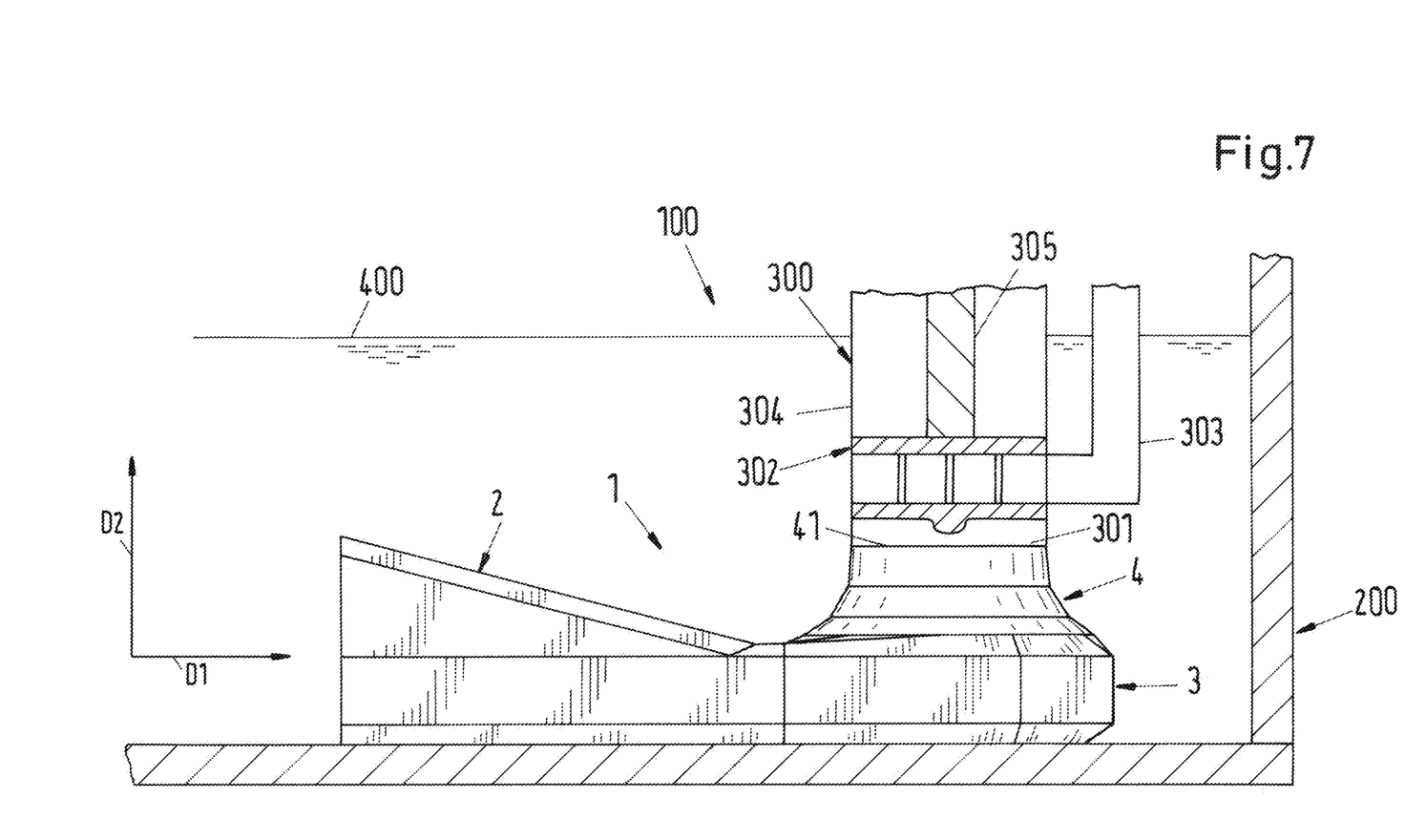
FIG. 7 is a schematic representation of an embodiment of an arrangement according to the invention installed in a sump.

For a better understanding of the invention reference is first made to FIG. 7 showing a schematic representation of an embodiment of an arrangement according to the invention which is designated with reference numeral 100. The arrangement 100 is installed in a sump, in a tank or any other receptacle which is designated with reference numeral 200 in FIG. 7. The sump 200 is represented in a sectional view to make the arrangement 100 visible. The sump 200 contains a fluid to be pumped out of the sump 200, for example a liquid like water or contaminated water, sea water, sewage or a liquid containing solid matters. The level of the liquid is indicated by its surface 400.

The arrangement 100 comprises a vertical pump 300 having an inlet 301 and the intake device 1 for the vertical pump 300. The intake device 1 is designed to be mounted to the vertical pump 300, in particular, the outlet section 4 of the intake device 1 is connected to the inlet 301 of the vertical pump 300, such that the outlet opening 41 of the intake device is directly facing the inlet 301 of the pump 300. The intake device 1 improves the flow conditions at the inlet 301 of the vertical pump 300, e.g. by making the flow of the fluid to be pumped uniform, by preventing or reducing the generation of vortices and swirls at the inlet 301 of the pump 300, or by breaking existing vortices or swirls.

The vertical pump 300 comprises, in a manner known as such, a casing 304 with the inlet 301 for the fluid to be pumped, an outlet 303 for discharging the fluid, at least one impeller 302, but often a plurality of impellers arranged in series on a common shaft 305, for conveying the fluid from the inlet 301 to the outlet 303, as well as a drive unit (not shown) for rotating the shaft 305 with the impeller(s) 302.

The representation of the vertical pump 300 and especially the representation of the impeller 302 shall be considered as a symbolic representation only. The impeller 302 or the plurality of impellers may be of any type which is used in vertical pumps, e.g. axial type, semi-axial type or radial type.

A vertical pump is a pump in which the shaft 305 for driving the impeller(s) 302 is extending in the vertical direction during operation of the pump. Vertical pumps 300 are well known in the art in numerous embodiments and designs and therefore there is no need for further explanations here. The vertical pump 300 may be any kind of known pumps, e.g. a centrifugal pump, a single stage pump or a multistage pump. Regarding the design of the impeller 302 or the impellers 302 this may be for example a radial design, an axial design, or a semi-axial design. Each impeller 302 may be an open impeller, a closed impeller or a semi-open impeller.

The vertical pump 300 is suspended with respect to the sump 200 such that at least the inlet 301 is completely submerged in the fluid. During operation, the vertical pump sucks the fluid from the sump 200 through the intake device 1 to the inlet 301 of the pump 300 and conveys the fluid to the outlet 303. By the intake device 1, particularly favorable flow conditions are created at the inlet 301 of the pump 300. At the inlet 301, the flow of fluid is very uniform and the generation of vortices, swirls or pre-swirls in front of the impeller 302 is prevented or at least considerably reduced.

Figure 2:
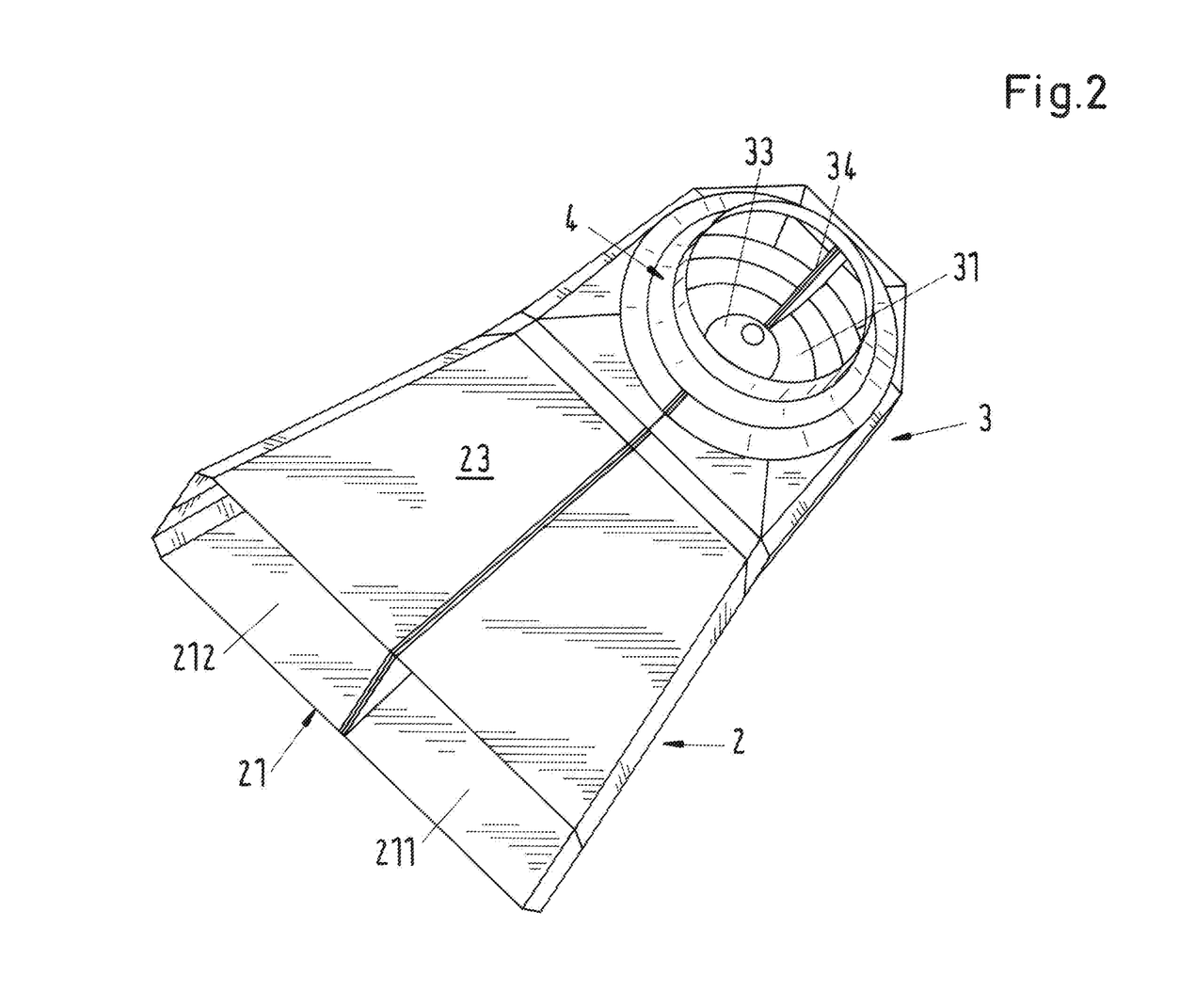
FIG. 2 is a perspective view of the embodiment shown in FIG. 1 from the top side.
Figure 3:
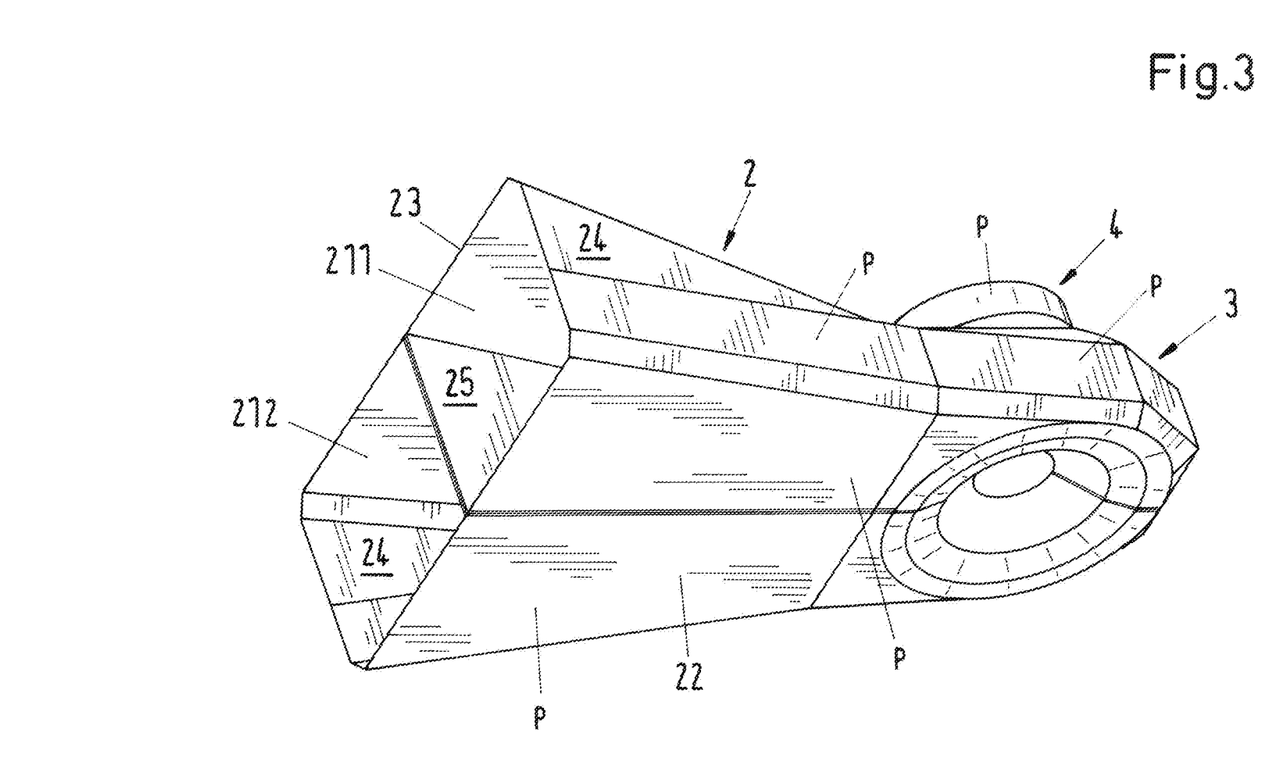
FIG. 3 is a perspective view of the embodiment shown in FIG. 1 from the bottom side.
Figure 4:
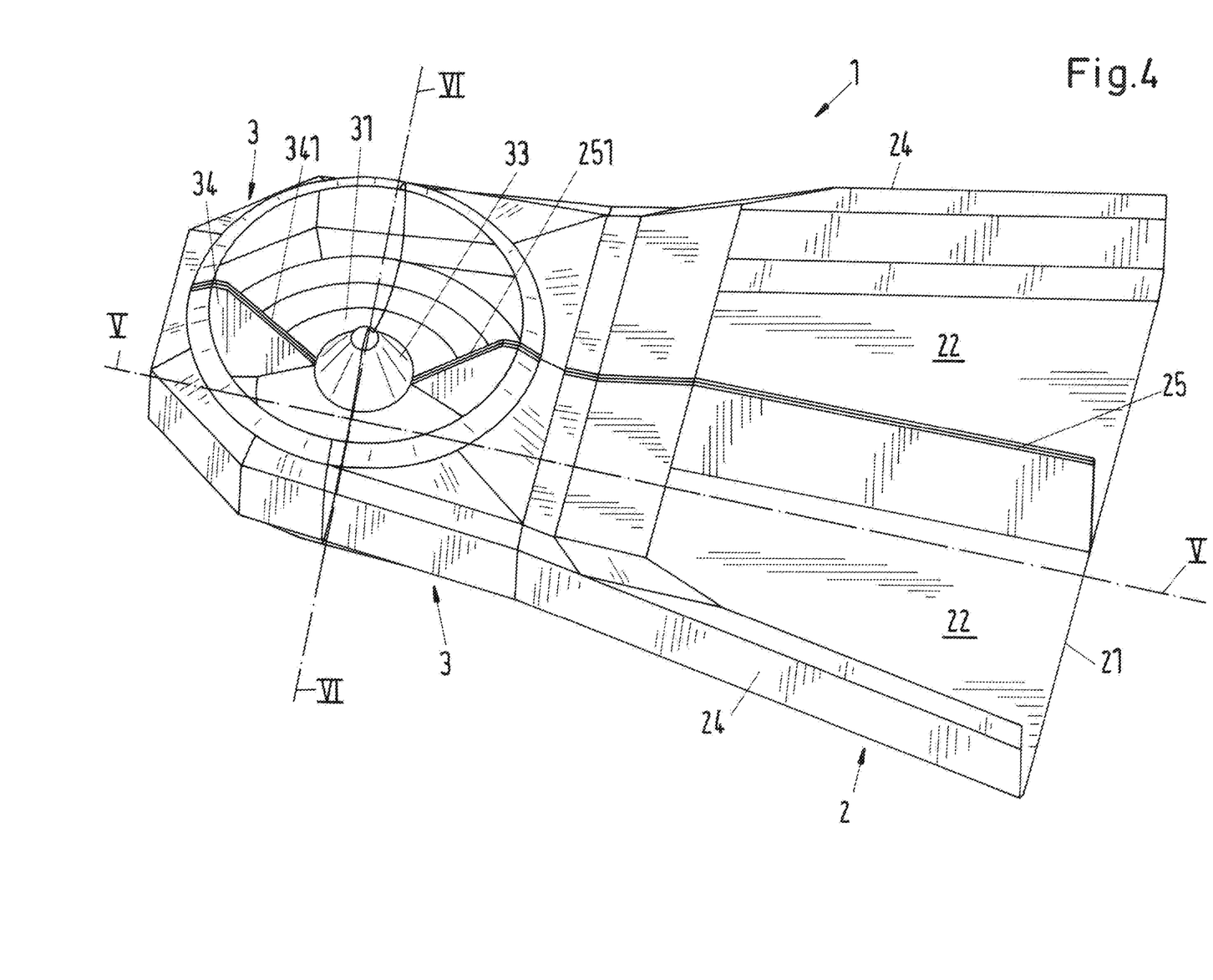
FIG. 4 is a perspective sectional view of the embodiment along section line IV-IV in FIG. 1.
Figure 5:
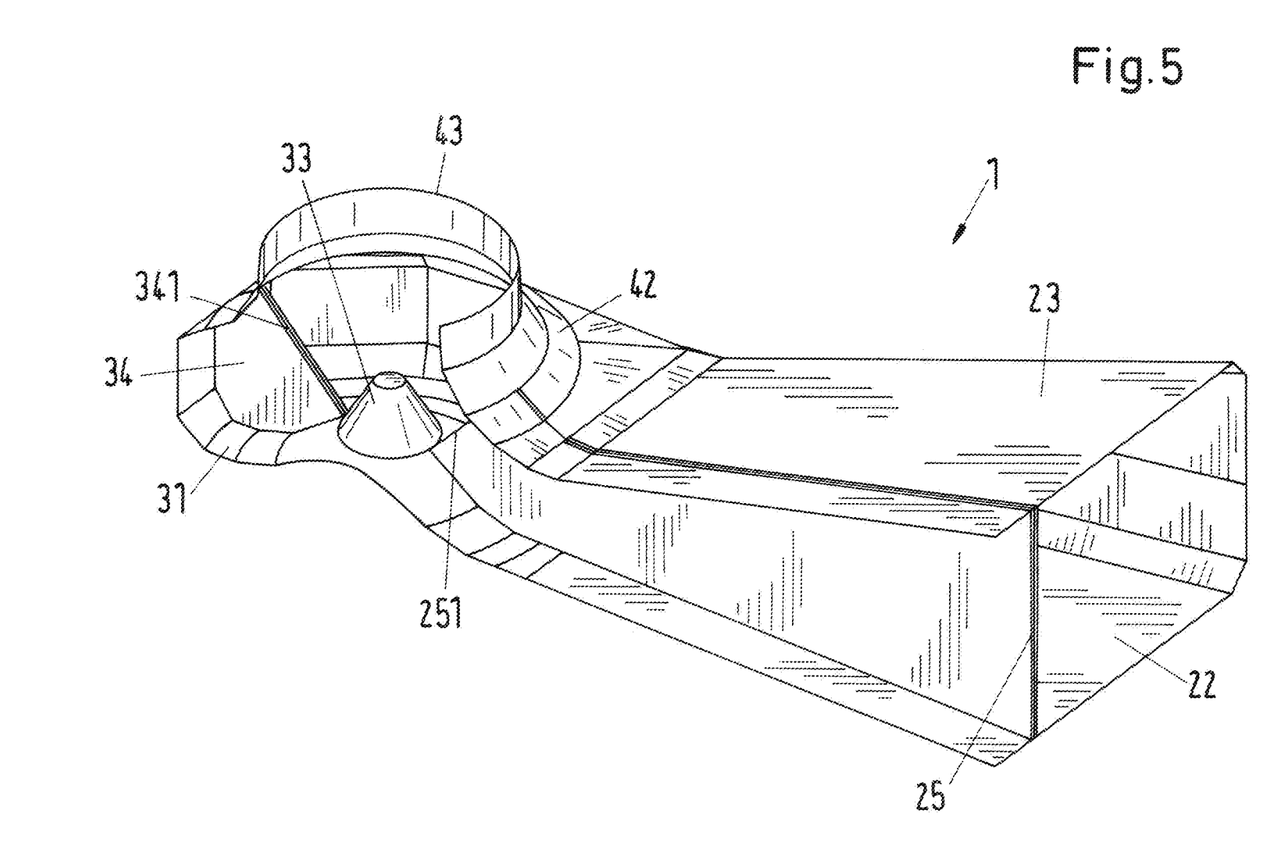
FIG. 5 is a perspective sectional view of the embodiment along section line V-V in FIG. 4.
Figure 6:
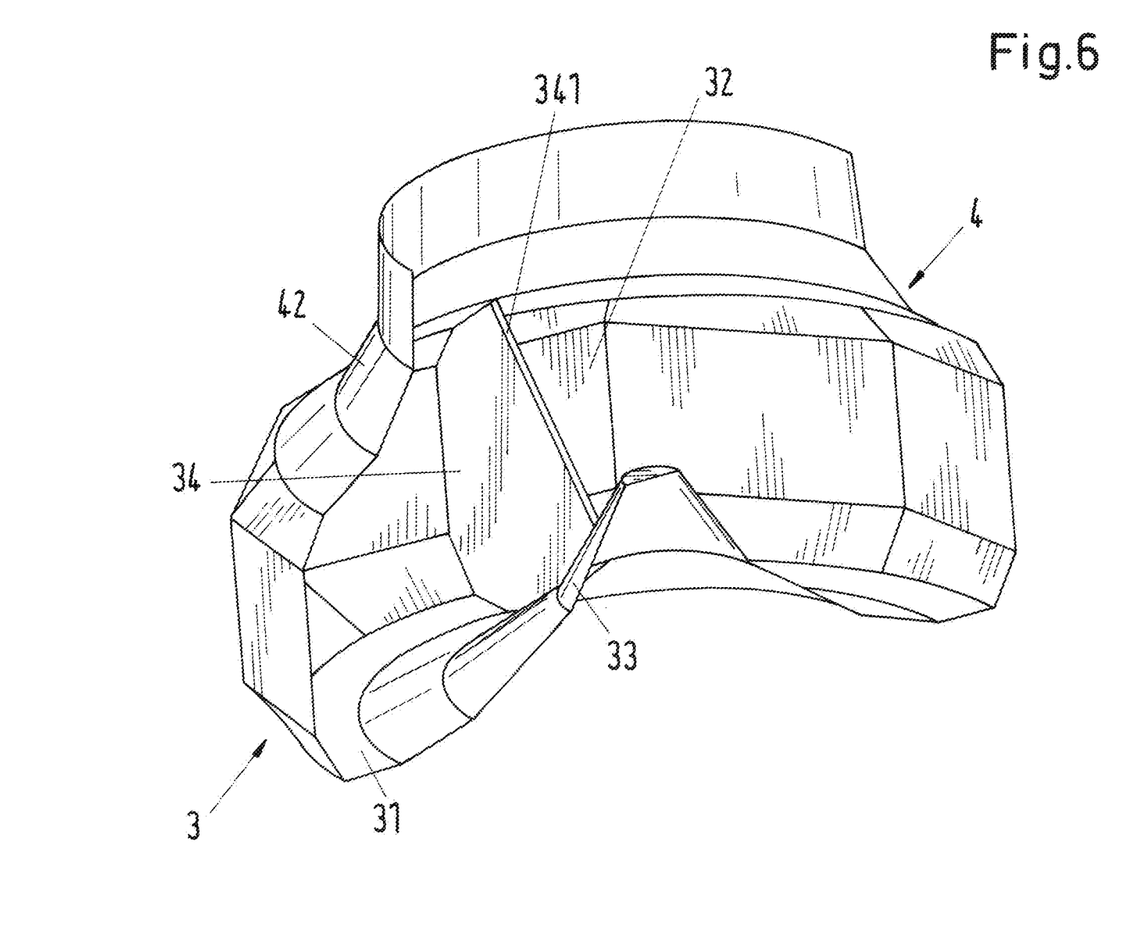
FIG. 6 is a perspective sectional view of the embodiment along section line VI-VI in FIG. 4.

Referring now to FIGS. 1-6, the embodiment of the intake device 1 will be described in more detail. For the sake of a better understanding FIGS. 2-6 show additional and different views of the embodiment of the intake device 1 shown in FIG. 1. FIG. 2 shows a perspective view from the top side, and FIG. 3 a corresponding view from the bottom side. FIG. 4-6 show different perspective sectional views, in particular to illustrate the inner structure and design of the intake device 1. FIG. 4 is a section along the section line IV-IV in FIG. 1. FIG. 5 and FIG. 6 are sections along the section lines V-V and VI-VI, respectively, in FIG. 4.

The fluid to be pumped enters the inlet section 2 through the inlet opening 21 and is guided by the inlet section 2 to flow mainly in the first direction D1, i.e. horizontally, towards the diverting section 3. The diverting section 3 smoothly diverts the flow of fluid from the first direction D1 to the second direction D2 and guides the fluid to the outlet section 4 which delivers the fluid through the outlet opening 41 to the inlet 301 of the pump 300.

The diverting section 3 has a bottom wall 31 opposing the outlet opening 41 as well as a back wall 32 opposing the inlet opening 21 and delimiting the intake device 1 with respect to the first direction D1. According to the invention, the diverting section 3 comprises a splitter member 33 (e.g. FIG. 2) which is arranged on the bottom wall 31 of the diverting section 3. The splitter member 33 is designed to taper in the second direction D2 towards the outlet opening 41. The splitter member 33 diverts the flow of fluid in two dimensions. The flow of fluid is deflected laterally, i.e. to the right and to the left as viewed in the first direction D1 from the inlet opening 21, and vertically i.e. towards the outlet opening 41.

Preferably, the splitter member 33 is arranged to be centered with respect to the outlet opening 41. For this purpose, the splitter member 33 is arranged such on the bottom wall 31 that a central axis C of the splitter member 33 passes through the center of the outlet opening 41.

The inlet section 2 has a generally rectangular cross section perpendicular to the first direction D1 and tapers from the inlet opening 21 towards the diverting section 3. Thus, the cross section area available for the flow of fluid decreases from the inlet opening 21 towards the diverting section 3. The inlet opening 21 has a rectangular cross section perpendicular to the first direction D1.

According to the invention, the outlet section 4 comprises a reducing part 42 for decreasing a cross sectional area (perpendicular to the second direction D2) of the outlet section 4, and the reducing part 42 is designed in an essentially bell shaped manner. The bell shaped reducing part 42 considerably contributes to creating favorable flow conditions at the outlet opening 42.

In the embodiment described herein the reducing part 42 of the outlet section is connected to the diverting section 3. The outlet section 4 further comprises a cylindrical part 43 of constant diameter which is arranged adjacent to the reducing part 42. Thus, the reducing part 42 is arranged between the diverting part 3 and the cylindrical part 43. The cylindrical part 43 constitutes the wall which delimits the outlet opening 41 and may be used to connect the intake device 1 with the pump 300.

The inlet section 2 comprises a bottom 22, a cover 23 and to side walls 24 each of which extends from the bottom 22 to the cover 23 and thus connects the bottom 22 with the cover 23. As can be best seen in FIG. 3 and FIG. 4 the bottom 22 is designed as a plate having a trapezoidal shape wherein the longer of the two parallel edges of the trapezoid is at the inlet opening 21 and the shorter of the two parallel edges is adjacent to the diverting section 3. Each of the two inclined edges of the trapezoid is connected to one of the side walls 24. Each side wall 24 is designed as a plate extending vertically between the bottom 22 and the cover 23 and in the first direction D1 from the inlet opening 21 to the diverting section 3.

The bottom 22 is arranged horizontally, i.e. parallel to the first direction D1. The cover 23 is arranged to be inclined with respect to the first direction D1 such that the distance between the bottom 22 and the cover 23 decreases from the inlet opening 21 towards the diverting section 3.

Preferably, the inlet section 2 comprises a partition wall 25 (see in particular FIG. 4) extending in the first direction D1 from the inlet opening 21 towards the diverting section 3 and extending in the second direction from the bottom 22 to the cover 23. The partition wall 25 is connected both to the bottom 22 and the cover 23. Within the inlet section 2 the partition wall 25 has a rectangular shape. The partition wall 25 divides the incoming flow of fluid into two partial flows which are guided through the inlet section separated from each other.

It is advantageous that the partition wall 25 divides the inlet opening 21 into two orifices 211 and 212 (see FIG. 2) having the same cross sectional area perpendicular to the first direction D1. Thus, both orifices 211, 212 have essentially the same rectangular shape and the same size. The partition wall 25 then extends centrally in the middle between the side walls 24 having the same distance from each of the side walls 24

It is preferred, as shown in FIG. 4, that the partition wall 25 protrudes from the inlet section 2 and also extends into the diverting section 3. At the bottom wall 31 of the diverting section 3, the partition wall 25 ends at or closely to the splitter member 33 which is arranged at the bottom wall 31 of the diverting section 3. Thus, the two partial flows into which the flow of fluid is divided by the partition wall 25 at the inlet opening 21 are guided to the splitter member 33 separated from each other.

Adjacent to the splitter member 33 the partition wall 25 has an ending edge 251 (see FIG. 4 and FIG. 5) starting at the bottom wall 31 of the diverting section 3 and is inclined both with respect to the first direction D1 and with respect to the second direction D2. The ending edge 251 is backwardly inclined towards the inlet opening 21, such that the distance between the splitter member 33 and the ending edge 251 increases with increasing distance from the bottom wall 31 of the diverting section 3. This design enables a very smooth redirection of the flow of fluid.

The bottom wall 31 of the diverting section 3 extends with respect to the first direction D1 beyond the outlet opening 41 such that there is a displacement E (FIG. 1) in the first direction D1 between the back wall 32 of the diverting section 3 and the wall delimiting the outlet opening 41, i.e. the cylindrical part 43 of the outlet section 4. This means that the entire outlet opening 41 is closer to the inlet opening 21 with respect to the first direction D1 than the back wall 32 of the diverting section. By this measure, the flow of fluid coming from the inlet opening 21 is guided in the diverting section 3 not only upwardly in the second direction D2 but also backwardly with a flow component directed towards the inlet opening 21.

In the space between the back wall 32 of the diverting section 3 and the splitter member 33, a stopper wall 34 is arranged to keep the partial flows essentially separated from each other also in the space behind the splitter member 33—as viewed in the flow direction of the fluid. Thus, the partial flows are reunified essentially only in the reducing part 42 of the outlet section 4. The stopper wall 34 is extending in the first direction D1 and in alignment with the partition wall 25. Thereby the stopper wall 34 is like an elongation of the partition wall 25 on the other side of the splitter member 33. The maximum height of the stopper wall 34, i.e. its maximum extension in the second direction D2 is preferably the same as the height of the partition wall 25 in the second direction D2 at the end of the ending edge 251 facing away from the splitter member 33.

Analogously to the ending edge 251 of the partition wall 25, the stopper wall 34 has a beginning edge 341 adjacent to the splitter member 33. The beginning edge 341 starts at the bottom wall 31 of the diverting section 3 adjacent to the splitter member 33 and is inclined both with the respect to the first direction D1 and with respect to the second direction D2. Preferably the angle of inclination of the beginning edge 341 is the same as the angle of inclination of the ending edge 251. Thereby the flow conditions around the splitter member 33 are very symmetrical.

The splitter member 33 which is designed to taper towards the outlet opening 41 is preferably rotationally symmetrical with respect to a longitudinal axis extending in the second direction D2. In the embodiment described here this longitudinal axis is the central axis C. The splitter member may be designed for example as a paraboloid, a truncated paraboloid, a hyperboloid, or a truncated hyperboloid.

In particular, the splitter member may be designed in an essentially cone-shaped or fructoconical manner.

Of course, a lot of variations are possible for the specific embodiment or the specific design of the intake device 1. Just to mention one possible variation, the inlet section 2 of the intake device 1 may also be designed with the cover 23 extending horizontally, i.e. parallel to the first direction D1, and with the bottom 22 being arranged to be inclined with respect to the first direction D1 such that the distance between the bottom 22 and the cover 23 is decreasing from the inlet opening 21 towards the diverting section 3. Such a variation would result in a design similar as shown in FIG. 1, however with the inlet section 2 rotated 180° around the first direction D1 and with the diverting section 3 as well as the outlet section 4 maintained as shown in FIG. 1

The intake device 1 may be manufactured by any method known in the art, for example by casting or by any suited subtractive manufacturing processes like machining, metal cutting, milling or combinations thereof. In order to make the intake device particularly cost efficient and especially in view of low manufacturing costs it is preferred to fabricated the intake device from a plurality of metallic parts which are joined, preferably by welding.

The preferred manufacturing to fabricate the intake device from a plurality of metallic parts is indicated in FIG. 3 where the individual metallic parts are designated with the reference numerals P. The intake device 1 is assembled from the plurality of metallic parts P. Each individual part P is brought to the appropriate shape before the individual parts are joined to each other to form the intake device 1. The preparation of the individual parts P to bring them in the desired shape may be done by different methods, for example by cutting, machining, bending, kinking and so on. The individual metallic parts P are then joined by welding to form the intake device 1.

The number of individual parts P for assembling the intake device 1 may be chosen in an appropriate manner according to the specific application. One possibility is, for example, to assemble first the inlet section 2, the diverting section 3 and the outlet section 4 each as separate component and afterwards assembling these three components to form the intake device 1. However, it is also possible e.g. to fabricate the diverting section 3 and the outlet section 4 as a single component or piece by appropriately shaped individual parts. It is no problem for a skilled person to determine a suited way how to fabricate the intake device 1 from individual parts P.

As feedstock material for the preparation of the metallic parts P for example metallic sheets, metallic plates or metallic bands may be used.

The intake device 1 according to the invention is also particularly suited for retrofitting existing pumps or pump installations to improve the flow conditions at the inlet of a vertical pump. Instead of performing laborious civil work in a sump 200 of such a pump installation, an intake device 1 designed in accordance with the invention may be connected with its outlet section 4 to the inlet of the vertical pump 300. It is also possible to connect the inlet section 2 together with the diverting section 3 to an already existing inlet bell of a vertical pump in order to realize an intake device in accordance with the invention.

The invention claimed is:

1. An intake device for being mounted to a vertical pump, the intake device comprising:

an inlet section with an inlet opening for a fluid to be pumped by the vertical pump, the inlet section extending in a first direction for horizontally guiding a flow of the fluid;

an outlet section with an outlet opening for delivering the fluid to an inlet of the vertical pump, the outlet section connectable to an inlet of the vertical pump, the outlet section extending in a second direction perpendicular to the first direction; and a diverting section configured to divert the flow of fluid from the first direction to the second direction, the diverting section connecting the inlet section with the outlet section, and having a bottom wall opposing the outlet opening and a back wall opposing the inlet opening, the inlet section tapering towards the diverting section decreasing a cross section area of the inlet section, the diverting section comprising a splitter member arranged on the bottom wall and tapering in the second direction towards the outlet opening, the outlet section comprising a reducing part decreasing a cross section area of the outlet section, the reducing part being essentially bell shaped, and the inlet section comprising a bottom, a cover, and two side walls each connecting the bottom with the cover, the inlet section comprising a continuous partition wall extending in the first direction from the inlet opening into the diverting section, and extending in the second direction from the bottom to the cover, the continuous partition wall including an end disposed in direct contact with the splitter member.

2. The intake device in accordance with claim 1, wherein the partition wall extends at the bottom wall of the diverting section and ending at or adjacent to the splitter member.

3. The intake device in accordance with claim 1, wherein the partition wall divides the inlet opening into two orifices having the same cross sectional area perpendicular to the first direction.

4. The intake device in accordance with claim 1, wherein the partition wall has an ending edge adjacent to the splitter member, the ending edge starting at the bottom wall and being inclined both with respect to the first and the second direction.

5. The intake device in accordance with claim 1, wherein the bottom wall of the diverting section extends with respect to the first direction beyond the outlet opening such that there is a displacement in the first direction between the back wall of the diverting section and the wall delimiting the outlet opening.

6. The intake device in accordance with claim 1, further comprising a stopper wall arranged between the back wall of the diverting section and the splitter member.

7. The intake device in accordance with claim 6, wherein the stopper wall extends in the first direction and the stopper and the partition wall are aligned along an axis.

8. The intake device in accordance with claim 6, wherein the stopper wall has a beginning edge adjacent to the splitter member, the beginning edge starting at the bottom wall and being inclined both with respect to the first and the second direction.

9. The intake device in accordance with claim 1, wherein the splitter member is arranged to be centered with respect to the outlet opening.

10. The intake device in accordance with claim 1, wherein the splitter member is rotationally symmetrical with respect to a longitudinal axis extending in the second direction.

11. The intake device in accordance with claim 1, wherein the splitter member is cone-shaped or frustoconical.

12. The intake device in accordance with claim 1, wherein the intake device is formed from a plurality of metallic parts which are joined.

13. The intake device in accordance with claim 12, wherein the plurality of metallic parts comprises metallic sheets or metallic plates or metallic bands.

14. An arrangement comprising:
a vertical pump; and
an intake device for the vertical pump, the intake device being designed according to claim 1.

15. The arrangement in accordance with claim 14, wherein the outlet section of the intake device is connected to the inlet of the vertical pump.

16. The intake device in accordance with claim 12, wherein the metallic parts are joined by welding.

17. The intake device in accordance with claim 1, wherein the the intake device is configured to be retrofitted onto the vertical pump.

18. The intake device in accordance with claim 1, wherein an end of the bottom and an end of the cover define the inlet opening, and the end of the continuous partition wall is a first end and the continuous partition wall includes a second end, the second end being disposed at the inlet opening and the first end being disposed in direct contact with the splitter member.

* * * * *